United States Patent [19]

Naito

[11] Patent Number: 4,918,364

[45] Date of Patent: Apr. 17, 1990

[54] METHOD FOR CONTROLLING NOISE AND VIBRATION OF MACHINE TOOLS WITH HIGH EFFICIENCY

[75] Inventor: Kinshiro Naito, Kanagawa, Japan

[73] Assignee: Amada Company, Limited, Japan

[21] Appl. No.: 12,173

[22] Filed: Feb. 9, 1987

[30] Foreign Application Priority Data

Feb. 7, 1986 [JP] Japan .................................. 61-25282

[51] Int. Cl.[4] .............................................. G05D 15/00

[52] U.S. Cl. .................................... 318/646; 318/434; 318/460

[58] Field of Search ................................ 318/430–434, 318/460, 638, 646, 651, 652, 561, 565, 566, 302, 305, 309, 310, 311–315; 72/6, 10–12

[56] References Cited

U.S. PATENT DOCUMENTS

| | | | |
|---|---|---|---|
| 3,020,452 | 2/1962 | Tudbury | 318/460 |
| 3,809,488 | 5/1974 | Sonderegger | 318/646 |
| 3,825,811 | 7/1974 | Smith et al. | 318/646 |
| 4,090,118 | 5/1978 | Smith, Jr. | 83/295 |
| 4,459,525 | 7/1984 | Hasegawa | 318/561 |
| 4,622,504 | 11/1986 | Yamazaki | 318/561 |
| 4,626,754 | 12/1986 | Habermann et al. | 318/460 |

*Primary Examiner*—William M. Shoop, Jr.
*Assistant Examiner*—David Martin
*Attorney, Agent, or Firm*—Wigman & Cohen

[57] ABSTRACT

A method for controlling the noise and vibration of machine tools in correspondence with environmental control standards includes determining a first level of noise and vibration generated by the machine tool during its operation, selecting a desired level of noise and vibration generated by said machine tool during its operation, and controlling the operation of said machine tool so that said machine tool operates at a second level of noise and vibration, wherein said second level of noise and vibration is below said desired level of noise and vibration. In a specific embodiment the stroke speed of the stroke section of a plate processing machine is controlled.

8 Claims, 4 Drawing Sheets

•
•
•

•
•
•

METHOD FOR CONTROLLING NOISE AND VIBRATION OF MACHINE TOOLS WITH HIGH EFFICIENCY

BACKGROUND OF THE INVENTION

TECHNICAL FIELD OF THE INVENTION

The present invention relates to a method for controlling noise and vibration of a machine tool such as a plate processing machine having a stroke action part for processing an object such as a plate or the like by controlling a stroke speed of the stroke action part, which is capable of reducing the levels of noise and vibration of the machine tool to below predetermined values, and of processing the object with high efficiency.

TECHNICAL BACKGROUND OF THE INVENTION AND PROBLEM AREAS

All types of press machines, shearing machines, and other plate processing machines which have a stroke action generate an extremely large vibration or noise during the process operation.

For example, with tests of turret punch presses, there is a vibration of about 75 dB at a position one meter from the punch turret, and about 58 dB at a position 10 meters away, wherein the relationship between the distance and the vibration is almost linear. Also, there is noise of about 98 dB at a distance of one meter from the center of the punch, and a noise of about 75 dB at a position 40 meters away, wherein the relationship between the distance and the noise is almost linear.

This vibration or noise is caused, for example, by flexion of the frame and between the stroke action section and the plate material during the action of the stroke action section, and has the characteristic that the amount becomes greater as the stroke velocity increases.

The environment control standards have a provision on the regulation values of noise and vibration for different districts and for daytime and night.

Accordingly, the use of a plate processing machine which has a stroke action section is severely restricted according to the time of day and the location. In districts where the regulations are very strict it becomes necessary to install elaborate vibration prevention or noise prevention devices.

OBJECT OF THE INVENTION

An object of the present invention is to provide, with due consideration to the drawbacks of such conventional devices, a method for controlling the stroke of a plate processing machine by which it is possible to carry out processing with low vibration and low noise at high efficiency.

SUMMARY OF THE INVENTION

In order to accomplish this object of the present invention, a method for controlling the stroke of a plate processing machine which has a stroke action section as one processing means is provided wherein, during the stroke interval of the stroke action section, at least at the interval during which the plate processing machine generates a large vibration or noise, the stroke velocity of the stroke action section of a plate processing machine is variably controlled; and, at that interval, the vibration or noise generated by the plate processing machine is below an allowable value and the stroke velocity of the stroke action section is controlled to give a value close to this allowable value.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENTS

The preferred embodiments of the invention will now be specifically explained with reference to the drawings.

Figure 1:
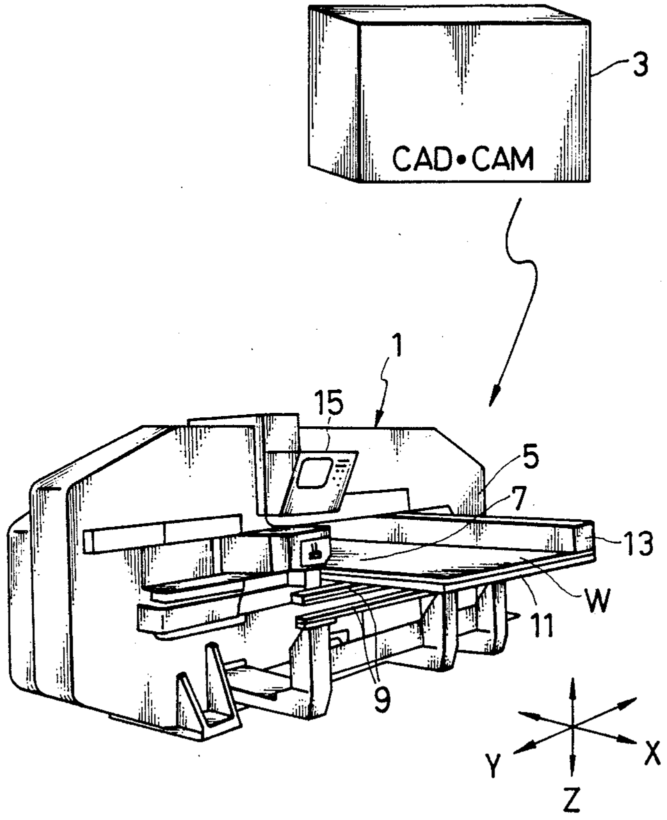
FIG. 1 is a perspective view of a hydraulic turret punch press which can implement the method of the present invention.

FIG. 1 is a perspective view of a turret punch press with which it is possible to implement the method of the present invention.

As shown in the drawing, a turret punch press 1 is connected to a CAD/CAM device 3, and is positioned in a metal plate processing line.

The turret punch press 1 of this embodiment of the present invention is almost the same shape as a usual turret punch press. Its structure will be briefly explained.

The turret punch press 1 has a frame 5. Provided inside of the frame 5 are an upper turret and a lower turret, having a prescribed space therebetween, and which rotate around the vertical axis (Z-axis). A plurality of punches are installed in the position of the plane (XY) of the upper turret, and a plurality of dies are installed in the position of the plane of the lower turret corresponding to these punches.

Provided on the top of the frame 5 is a cylinder device 7 on which is provided a vertically moving ram. The ram is positioned on the top of the upper turret. A punch positioned below the upper turret is moved by pressure toward the die. A Y-axis guide rail 9 is provided on the side surface of the frame 5. Provided on the Y-axis guide rail 9 is a moving member which is guided in the Y-axis direction by means of a Y-axis servomotor. A table 11, provided with a free bearing, is secured to the top surface of the moving member.

A carriage 13 which can be moved in the X-axis direction by means of an X-axis servomotor is provided on the Y-axis table 11. Provided on the carriage 13 is a plate clamping mechanism which guides a plate W in the XY plane and secures the plate W which is loaded on the table 11.

The turret punch press 1 constructed in the manner described is capable of performing a prescribed punching process at a prescribed location on the plate W by means of the driving of the cylinder device 7 and guiding the carriage 13 in the XY plane.

Figure 2:
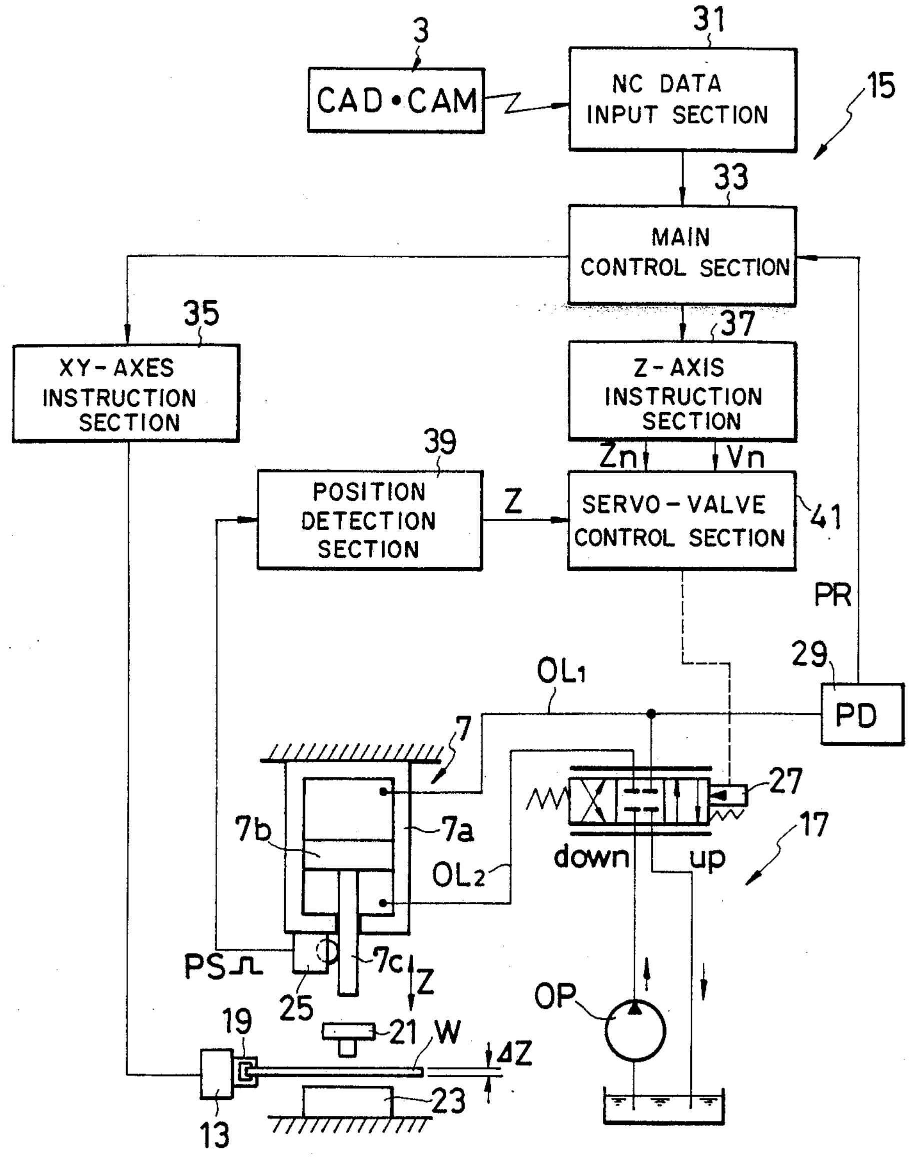
FIG. 2 is a block diagram showing one example of a control circuit for the turret punch press of FIG. 1.

FIG. 2 is a control system block diagram which shows an outline f an NC device 15 and also shows an outline of the hydraulic circuit 17 of the cylinder device 7.

As shown in the drawing, the cylinder device 7 is provided with a piston 7*b* in a cylinder 7*a*. A ram 7*c* which moves freely in the vertical (Z) direction is connected to the piston 7*b*. A plate clamp device 19, a punch 21, and a die 23 are also provided in the turret punch press 1. Provided on the bottom surface of the cylinder 7*a* is a pulse encoder 25 which has a roller in contact with the ram 7*c* and detects the movement of the ram by a pulse signal PS.

The hydraulic circuit 17 is provided with a servo-valve 27 which is connected to a hydraulic pump OP, and which is also connected to the top and bottom chambers of the cylinder 7*a* through a piping assembly OL1 and a piping assembly OL2. A pressure detection device 29 which detects the hydraulic pressure in the piping through an electric signal is provided in the piping assembly OL1.

The NC device 15 comprises an NC data input section 31, a main control section 33, an XY-axes instruction section 35, a Z-axis instruction section 37, a position detection section 39, and a servo-valve control section 41.

The NC data input section 31 communicates both on-line and off-line with the CAD/CAM device 3. The NC data input section 31 receives NC data for controlling the turret punch press 1 from the CAD/CAM device 3 and provides this data to the main control section 33.

The main control section 33 is operated by an operating system and receives the NC data from the NC data input section 31, mainly to control the positioning of the plate W and to carry out the drive control of the cylinder device 7. In addition, the main control section 33 is connected to various types of sensors, limit switches, and other types of actuators to generally control the turret punch press 1.

The XY-axes instruction section 35 receives the prescribed position control data from the main control section 33 and controls the positioning of the plate W in the XY plane by driving the X-axis and Y-axis servomotors.

The Z-axis instruction section 37 receives the Z-axis instruction data from the main control section 33 and outputs the data relative to the position Zn and velocity Vn for driving the servo-valve.

The position detection section 39 integrates a series of pulse signals PS which are output by the pulse encoder 25, to detect the present position Z of the ram 7*c*. The pulse encoder 25 is of a type which outputs a pulse signal in a two-phase format in which the phases differ by $\frac{1}{4}$. The position detection section 39 is capable of determining the direction of motion of the ram 7*c* based on this two-phase pulse signal.

The positional data Zn and velocity data Vn from the Z-axis instruction section 37, as well as the present position Z of the ram 7*c* from the position detection section 39, are input to the servo-valve control section 41. The servo-valve control section 41 controls the servo-valve 27 to the prescribed position and to the prescribed degree of opening, based on the input values.

Figure 3:
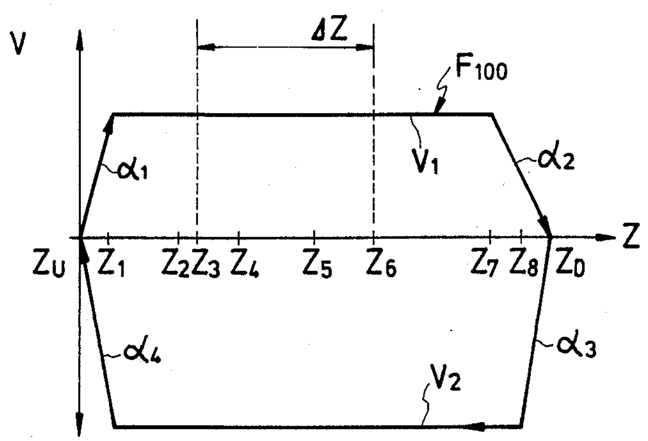
FIG. 3 is an explanatory drawing showing one example of a velocity instruction.

FIG. 3 is an explanatory drawing showing one example of a velocity instruction for the ram 7*c*. The position Z, which is the position of the tip of the ram 7*c*, is shown in the drawing. A position $Z_U$ indicates the top dead point, and a position $Z_D$ indicates the bottom dead point. In addition, a position Z3 indicates the position of the top of the ram 7*c* when the tip of the ram 7*c* contacts the punch 21 when the punch 21 and the plate W come in contact. A position Z6 indicates the position at the top of the ram 7*c* at the time when the ram 7*c* is pressed down and the tip of the punch 21 coincides with the lower surface of the plate W. The thickness of the plate W is $\Delta Z$. A plurality of positions Z1, Z2, Z4, Z5, Z7, and Z8 are intermediate positions.

An instruction F100 is an instruction which causes the ram 7*c* to accelerate from the top dead point Zu to the position Z1 at an acceleration of $\alpha 1$ in the downward direction, to move from the position Z1 to the position Z7 at a uniform velocity V1, and to decelerate from the position Z7 to the bottom dead point $Z_D$ at an acceleration of $\alpha 2$. In addition, the instruction F100 causes a sudden acceleration from the bottom dead point $Z_D$ to the position Z8 at an acceleration of $\alpha 3$ in the upward direction, to move from the position Z8 to the position Z1 at a uniform velocity V2, and to decelerate from the position Z1 to the top dead point Zu at an acceleration of $\alpha 4$.

The instruction F100 is output from the Z-axis instruction section 37 to the servo-valve control section 41. The servo-valve control section 41 controls the servo-valve 27 with an open loop.

Figure 4:
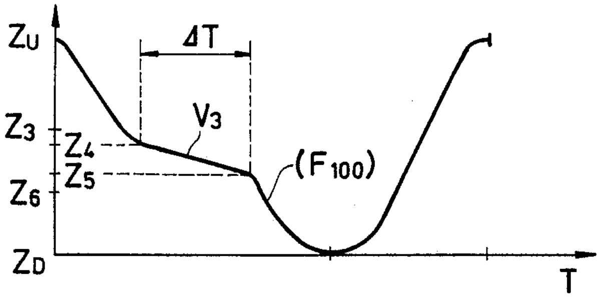
FIG. 4 is an explanatory drawing showing the actual action of a stroke action section.

FIG. 4 is an explanatory drawing showing the actual action of the ram 7*c* at the time T.

The ram 7*c* descends from the top dead point $Z_U$ and at the position Z3 causes the punch 21 and the plate W to contact. Subsequently, the ram 7*c* receives a load through the punch 21 and at the position Z4 causes the frame 5 to be bent. Then the ram 7*c* approaches the position Z5 and here the load is immediately reduced, and the ram 7*c* passes through the position Z7 to arrive at the bottom dead point $Z_D$. The time required for the ram 7*c* to pass between the positions Z4 and Z5 is $\Delta T$ (for example, 40 m sec).

Vibration or noise is developed at the position Z3 which is shown as the position where the plate W is contacted, or, between the positions Z3 and Z4 where the load is large, and also, between the positions Z4 and Z5 where the load is decreasing. The vibration or noise at position Z3 is produced by the mutual interference of the ram 7*c*, the punch 21, the plate W, and the die 23. The vibration or noise between the positions Z3 and Z4 is caused by the flexion of the frame 5. The vibration or noise between the positions Z4 and Z5 is produced by the shearing action of the punch 21. The vibration or noise at the position Z5 is produced by the release of the flexion of the frame 5 when the punch 21 cuts out the plate W, and by the instantaneous release of the pressure in the cylinder 7*a*.

The magnitude of this vibration or noise is proportional to the velocity V3 of the ram 7*c* between the positions Z4 and Z5, or is almost proportional to the time $\Delta T$ for the ram 7*c* to pass from the position Z4 to the position Z5.

In this embodiment, the method of the present invention is applied to adjust the time $\Delta T$ shown in FIG. 4, so that the vibration or noise becomes a set value which is a value smaller than the environmental control standard value. In other words, in this embodiment, the time $\Delta T$ shown in FIG. 4 is controlled to a prescribed value by controlling the velocity V1 shown in FIG. 3 to an appropriate velocity.

As a result, the turret punch press 1 does not develop a vibration or noise which is larger than the environmental control standard value. Also, because the ram 7c carries out a high speed action within the allowable range of the set value, the operating efficiency increases 20% to 30%, which is different from the case where the velocity of the ram 7c is made excessively low.

Then, the velocity V1 shown in FIG. 3 is calculated in the CAD/CAM device 3, and is instructed to the servo-valve control section 41 through the main control section 33. Specifically, an empirical formula for the vibration and noise of the turret punch press obtained corresponding to the processing conditions—quality A, plate thickness B, shape C, process type D—is input to the CAD/CAM device 3. Then the CAD/CAM device 3 is able to calculate, by means of instructions with these various conditions as parameters, an optimum velocity V1 such that the vibration and noise are reduced to a level below and close to the set value.

Further, in the case where the optimum velocity V1 is determined for each individual stroke of the ram 7c, the ram 7 sometimes acts slowly and at other times quickly. Further, the value of the vibration or noise generated by the turret punch press 1 is always lower than the environmental control standard value and is close to this standard value.

Figure 5:
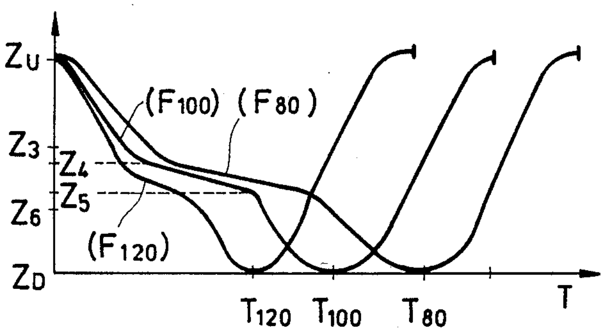
FIG. 5 is an explanatory drawing showing an example of the modification of an velocity instruction.

FIG. 5 is an explanatory drawing showing another example of the instruction method for the velocity V1 shown in FIG. 3. The curve F100 is the same as the curve F100 shown in FIG. 4.

In this example, the set-up function of the NC device 15 is used in such a way that the descending velocity V1 of the instruction F100 shown in FIG. 3, is changed to 120% or 80%. As a result, the velocity V1 is selected from the standard values F100 input to the NC device 15 for modification, making it possible to restrain the vibration or noise generated in the turret punch press 1 to a prescribed amount.

Next, referring to FIG. 6 and FIG. 7, an example where the NC device 15 can easily learn the appropriate velocity for the ram 7c will be explained.

Figure 6:
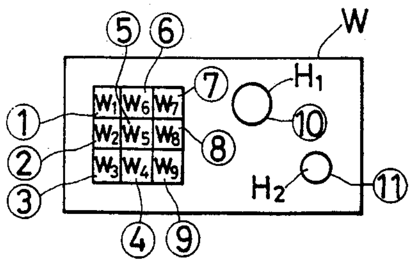
FIG. 6 is a plan view showing one example of a plate to be processed.

FIG. 6 shows one example where a plurality of products W1, W2, W3 . . . are taken out of the plate W in the order (1), (2), (3) . . . , and next a plurality of holes H1 and H2 are cut out.

The four sides of the product W1 are sheared and the product W1 is taken out. Then for the products W2, W3, W4, and W7, three sides are sheared and the products are taken out. Finally, for the products W5, W6, W8, and W9, two sides are sheared and the products are taken out. Also, both holes H1 and H2 are sheared with different circumferential lengths.

First, from a plurality of plates the first plate W is set on the turret punch press 1, and, for example, the instruction F100 shown in FIG. 3 is set in the NC device 15.

Figure 7A:
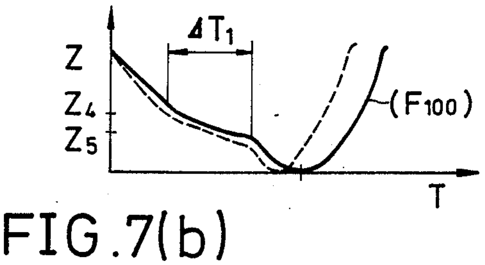
FIGS. 7 (*a*), 7 (*b*) and 7 (*i*) are charts illustrating the learning process of an embodiment of the method of the present invention.
Figure 7B:
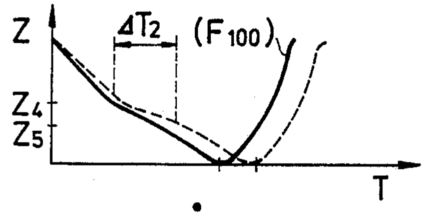
Figure 7I:
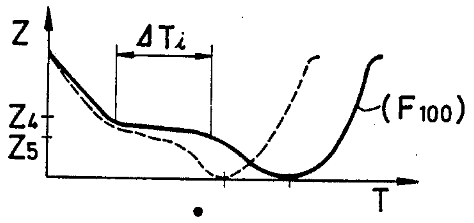

Next, the products W1 to W9 and the holes H1 and H2, shown in FIG. 6 are processed at the velocity of F100, and the times ΔT shown in FIGS. 7 (*a*), (*b*) . . . (*i*) are measured.

The values for the times ΔT are measured using the pressure detection device 29 and a clock in the main control section 33 shown in FIG. 2. Specifically, the main control section 33 carries out the measurement sequentially from the time when the plate W comes to the prescribed plane processing position and determines the time ΔT during which the value detected by the pressure detection device 29 becomes large, and subsequently becomes small. In this way, the fact that the measured time ΔT signifies the time ΔT shown in FIG. 4, is self evident from the conditions of receiving the load of the ram 7 shown in FIG. 3 and FIG. 4.

Accordingly, the NC device 15 compares the times ΔT1, ΔT2 . . . ΔTi . . . shown in FIG. 7, with the theoretical value corresponding to the length of shearing of each product or each hole, and revises the velocity V1 portion among the velocity values of F100, so that they are close to the theoretical values.

As outlined above, the ram 7c is driven as shown by the broken line in FIG. 7, and the value of the vibration or noise developed by the turret punch press 1 is below the normal environmental control standard value but close to this environmental control standard value.

In this example, when learning, the time ΔT is measured but the actual vibration or noise may also be measured using a vibration meter or noise meter. Based on these measurements, the velocity V1 may be modified as shown in FIG. 3.

The NC device 15 may be used to detect a stroke condition, and an appropriate communication means may be used to trace the stroke action, which is displayed on CRT or recorded by a printer, whereby the time ΔT obtained is used to change the velocity V1.

The embodiment shown above uses open loop control for velocity and acceleration in the servo-valve control section 41. However, it is obvious that feedback control could also be applied to velocity and acceleration in the method of the present invention.

Also, for the embodiment shown above, an example is given wherein the descent of the ram 7c is controlled at uniform velocity as shown in FIG. 3. However, it is obvious that, in the method of the present invention, it is also possible to implement all types of velocity change at each position during the descent of the ram.

During the descent of the ram 7c for the embodiment shown above, the velocity is changed uniformly. However, it is obvious that such a change may also be performed only in the interval from Z4 and Z5 shown in FIG. 3.

In the embodiment given above, a hydraulic turret punch press which performs a shearing process is given as an example of a plate processing machine with a stroke action section. However, it is obvious that the method of the present invention can be applied to a system other than a hydraulic system, or another type of press machine, or, for example, to a pressing process rather than a shearing process, or to a shearing machine rather than a press machine.

As will be understood in the description of embodiment above by means of the process of the present invention, it is possible to reduce the vibration or the sound from a plate processing machine which has a stroke action section as one processing means. Furthermore, it is possible to perform the stroke operation at as high a velocity as possible, so that the operating efficiency can be increased.

In addition, because it is possible, by means of the process of the present invention, to control the plate processing machine to a low vibration or a low noise, the chronological and locational vibration- or noise-related restraints on the plate processing machine can be eliminated over a wide range.

What is claimed is:

1. A method for controlling the noise and vibration of a punch press having a stroke action part for punching an object such as a plate and the like, comprising:

punching the object at a first speed of the stroke action part to measure a time of a predetermined interval of a stroke movement of the stroke action part while a certain load is added to the stroke action part in the predetermined interval;

comparing the measured time with a theoretical value experimentally predetermined depending on punching conditions; and revising the first speed to a second speed in the predetermined interval of the stroke movement of the stroke action part so that the measured time may approach the theoretical value, thereby reducing levels of the noise and the vibration of the punch press to below predetermined values, wherein the second speed is lower than that of the stroke action part before and/or after the punching operating is performed.

2. The method as defined in claim 1, wherein said punching, comparing, and revising are performed in a manner such that the levels of the noise and the vibration of the machine tool approach the predetermined values.

3. The method as defined in claim 2, wherein said punching, comparing, and revising are performed in a manner such that the load against the stroke action part decreases in the predetermined interval of the stroke movement of the stroke action part.

4. The method as defined in claim 3, wherein the speed of the stroke action part is operated in a CAD/CAM device depending on the processing conditions such as a quality, a thickness, a shape and a processing type.

5. The method as defined in claim 4, wherein the theoretical value is stored in the CAD/CAM device.

6. The method as defined in claim 5, wherein the revision from the first speed to the second speed of the stroke action is conducted by using a set-up function of a NC device.

7. A method for controlling the noise and vibration of a machine tool having a stroke action part for processing an object such as a plate and the like, comprising:

processing the object at a first speed of the stroke action part to measure a time of a predetermined interval of a stroke movement of the stroke action part while a certain load is added to the stroke action part in the predetermined interval;

comparing the measured time with a theoretical value experimentally predetermined depending on processing conditions; and revising the first speed to a second speed in the predetermined interval of the stroke movement of the stroke action part so that the measured time may approach the theoretical value, thereby reducing levels of the noise and the vibration of the machine tool to below predetermined values;

wherein the levels of the noise and the vibration of the machine tool approach the predetermined values, the load against the stroke action part decreases in the predetermined interval of the stroke movement of the stroke action part, the speed of the stroke action part is operated in a CAD/CAM device depending on the processing conditions such as a quality, a thickness, a shape and a processing type, the theoretical value is stored in the CAD/CAM device;

wherein the revision from the first speed to the second speed of the stroke action is conducted by using a set-up function of a NC device; and wherein the processing of the object is conducted at the first speed as a standard speed in a testing process in order to obtain the theoretical value, and then the processing of the object is conducted at the second speed determined according to the theoretical value.

8. The method as defined in claim 7, wherein the processing of the object is continuously conducted by at least two stroke actions of the stroke action part, and the revision from the first speed to the second speed of the stroke action part is conducted per each stroke action so that the noise and the vibration of the machine tool per each stroke action of the stroke action part may be approximately uniform in a single processing.

* * * * *